(12) United States Patent
Rawdon et al.

(10) Patent No.: US 8,267,665 B2
(45) Date of Patent: Sep. 18, 2012

(54) LAMINAR FLOW ROTOR AND RELATED METHODS AND SYSTEMS

(75) Inventors: Blaine K. Rawdon, San Pedro, CA (US); Arthur G. Powell, Hungtington Beach, CA (US); John C. Vassberg, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 967 days.

(21) Appl. No.: 12/237,911

(22) Filed: Sep. 25, 2008

(65) Prior Publication Data
US 2010/0074758 A1   Mar. 25, 2010

(51) Int. Cl.
*F01D 5/14* (2006.01)
*F01D 5/18* (2006.01)
*F03D 3/02* (2006.01)

(52) U.S. Cl. .............. 416/231 R; 416/232; 415/4.1; 290/55

(58) Field of Classification Search .......... 416/231 R, 416/232; 415/4.1; 290/55
See application file for complete search history.

(56) References Cited

U.S. PATENT DOCUMENTS

| | | | | |
|---|---|---|---|---|
| 3,606,573 | A | * | 9/1971 | Emmerson et al. ......... 416/90 R |
| 3,698,834 | A | * | 10/1972 | Meginnis .................... 416/96 R |
| 4,171,785 | A | | 10/1979 | Isenberg |
| 4,802,642 | A | | 2/1989 | Mangiarotty |
| 5,722,156 | A | | 3/1998 | Balfrey et al. |
| 7,959,412 | B2 | * | 6/2011 | Bonnet ..................... 416/231 R |

FOREIGN PATENT DOCUMENTS

EP   0776821   1/2001

OTHER PUBLICATIONS

Compiled by Jerry N. Hefner and Frances E. Sabo, Research in Natural Laminar Flow and Laminar-Flow Control:, NASA CP 2487, Part 1, Mar. 1987.
Compiled by Jerry N. Hefner and Frances E. Sabo, Research in Natural Laminar Flow and Laminar-Flow Control:, NASA CP 2487, Part 2, Mar. 1987.
Compiled by Jerry N. Hefner and Frances E. Sabo, Research in Natural Laminar Flow and Laminar-Flow Control:, NASA CP 2487, Part 3, Mar. 1987.

* cited by examiner

*Primary Examiner* — Alexander Ghyka
(74) *Attorney, Agent, or Firm* — Harness, Dickey & Pierce, P.L.C.

(57) ABSTRACT

A rotor blade including a root attachable to a rotor hub. The blade includes a tip and one or more channels aligned within the blade generally between the root and the tip. Each channel has a sealed first end and a second end vented to outside the blade. The channel(s) are vented to one or more exterior surfaces of the blade through one or more apertures in the exterior surface(s).

7 Claims, 13 Drawing Sheets

US 8,267,665 B2

LAMINAR FLOW ROTOR AND RELATED METHODS AND SYSTEMS

FIELD

The present disclosure relates to rotors and structures that include rotors, including but not limited to fans, wind turbines, aircraft, and helicopters.

BACKGROUND

The statements in this section merely provide background information related to the present disclosure and may not constitute prior art.

Wind turbine rotors, airplane propellers and ducted fans, helicopter rotors, and other rotating propellers and fans generally are designed with an eye toward maximizing efficiency and minimizing noise. Airfoil design, rotor plan form, twist and blade count, rotor ducting and rotor diameter are among the various design factors taken into account to optimize various rotor designs for particular uses.

SUMMARY

The present disclosure, in one implementation, is directed to a rotor blade including a root attachable to a rotor hub. The blade includes a tip and one or more channels aligned within the blade generally between the root and the tip. Each channel has a sealed first end and a second end vented to outside the blade. The channel(s) are vented to one or more exterior surfaces of the blade through one or more apertures in the exterior surface(s).

In another implementation, the disclosure is directed to a mechanical device including a rotor having a plurality of blades rotatable about a central axis. Each blade has one or more channels inside the blade and aligned generally lengthwise relative to the blade. Each channel has a sealed first end and a second end vented to outside the blade. Each blade has one or more exterior surfaces to which the channel(s) are vented through one or more apertures in the exterior surface(s).

In yet another implementation, the disclosure is directed to a rotor including a plurality of blades rotatable about a central axis of the rotor. Each blade has a tip and a root between the tip and the central axis. Each blade has one or more internal channels aligned generally between the root and the tip. Each channel is sealed at a first end of the channel and vented at a second end of the channel to outside the blade. Each blade has one or more exterior surfaces to which the channel(s) are vented through one or more apertures in the exterior surface(s).

In still another implementation, the disclosure is directed to a wind turbine including a rotor. The rotor has a plurality of blades rotatable about a central axis. Each blade has one or more internal channels situated generally span-wise relative to the blade. Each channel is sealed at a first end of the channel and vented at a second end of the channel to outside the blade. Each blade has one or more exterior surfaces to which the channel(s) are vented through one or more apertures in the exterior surface(s).

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be noted that although various implementations are described with reference to air as a working fluid, the disclosure is not so limited. Fluids other than or in addition to air, including but not limited to water, could be used as working fluids in various implementations.

In various aspects of the disclosure, centrifugal flow is used within internal channels of a rotor to create (1) suction for an active laminar flow system on an external aerodynamic surface of the rotor and/or (2) pressure for blowing an aerodynamic surface of the rotor. Various implementations of the disclosure can be used, e.g., to improve the efficiency and reduce the noise of wind turbine rotors, helicopter rotors, airplane propellers and other or additional rotating fans and/or propulsors. The term "rotor" is used in the disclosure and claims to refer to various devices including but not limited to wind turbine rotors, helicopter rotors, airplane propellers, airplane ducted fans, water propellers and rotors and other or additional rotating propellers and fans.

In various implementations, a rotor blade is provided that includes one or more internal channels aligned generally lengthwise in the blade, i.e., generally between a root and tip of the blade. As further described below, each channel is sealed shut at one end and is vented at its other end, directly or indirectly, to outside the blade. Channel(s) in a blade are vented to one or more exterior surfaces of the blade through one or more apertures in the exterior surface(s). When, e.g., a rotor including such a blade is rotated, centripetal acceleration causes air or other fluid within the blade channel(s) to tend to move toward the blade tip to produce a pressure differential within each of the channel(s). Suction or pressure is created in a channel, dependent on whether a tip end or a root end of the channel is sealed. Dependent on a particular configuration, pressure differential(s) in various channels may be such that suction, blowing, or both suction and blowing result on one or more exterior surfaces of a blade.

Figure 1:
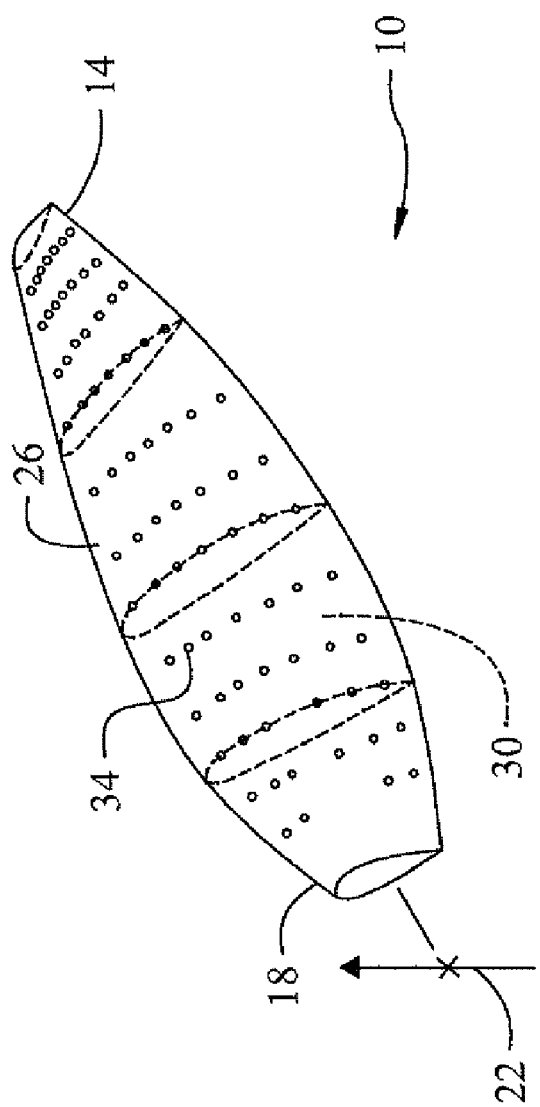
FIG. 1 is a top perspective view of a rotor blade in which suction may be produced in accordance with one implementation of the disclosure.

One exemplary configuration of a rotor blade in which suction may be produced is indicated generally in FIG. 1 by reference number 10. The blade 10 has a tip 14 and a root 18 configured for connection to a rotor hub indicated schematically by reference number 22. The blade 10 has upper and lower exterior surfaces 26 and 30. It should be understood that the terms "upper" and "lower" are used with reference to FIG. 1 as relative directional characterizations only, and that exterior surface contours of a blade could be configured differently than as shown in FIG. 1. A plurality of apertures 34 penetrate the exterior surfaces 26 and 30 and fluidly connect one or more channels (not shown in FIG. 1) extending at least partially through the blade 10 with ambient conditions outside the blade 10. It should be noted generally that numbers, sizes, shapes, orientation, and/or locations of apertures 34 may differ in various implementations. For example, it is not necessarily desirable in all configurations for apertures to be arranged in substantially consistent chord-wise lines as shown in FIG. 1. Further, in some configurations a single aperture 34 may be provided.

Figure 2:
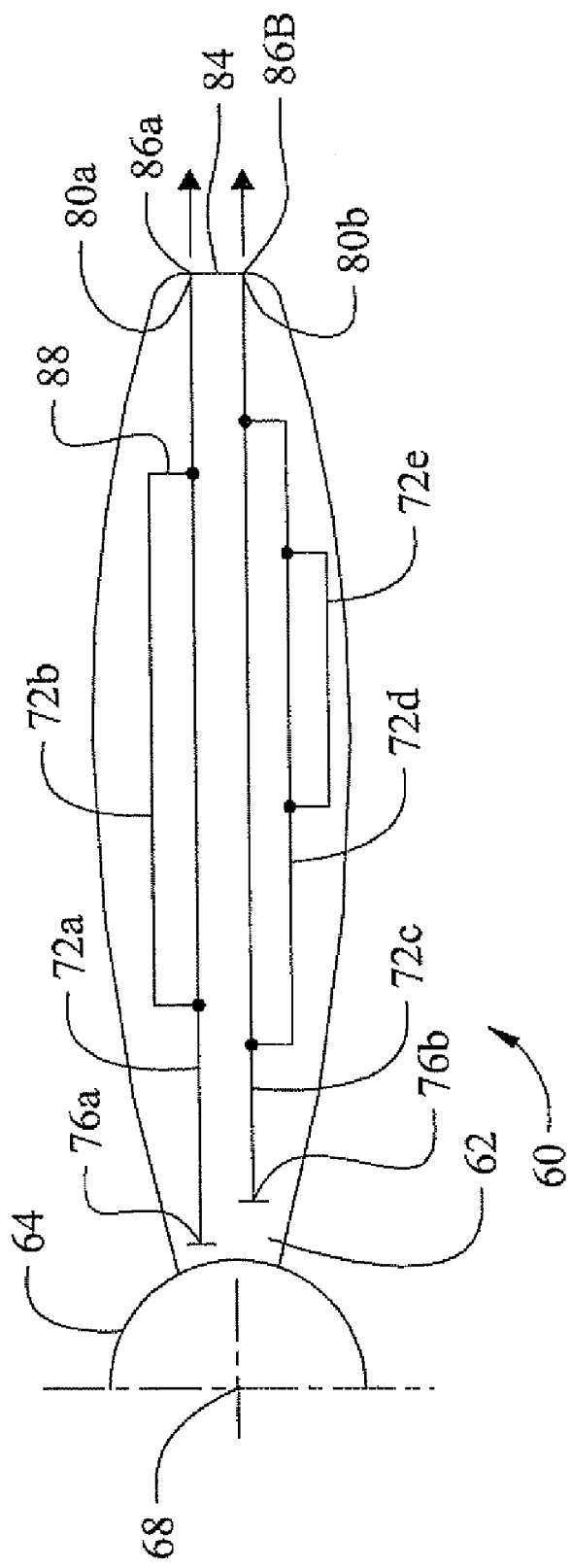
FIG. 2 is a schematic view of a rotor blade in which suction may be produced in accordance with one implementation of the disclosure.

One configuration of a rotor blade in which suction may be produced is indicated generally in FIG. 2 by reference number 60. A root 62 of the blade 60 is attached to a rotor hub 64 having an axis of rotation 68. Channels 72a-72e are aligned generally lengthwise within the rotor blade 60. Each channel 72a-72e is sealed shut, directly or indirectly, at hub ends 76a or 76b. Each channel 72a-72e is vented, directly or indirectly, at tip ends 80a or 80b to ambient conditions at the blade tip 84 through outlets 86a and 86b. Several of the channels 72a-72e are fluidly linked to others of the channels 72a-72e via substantially transverse channel links 88. It should be noted that other or additional channel outlets could be located at other or additional radial locations and are not necessarily at the tip 84. In the present exemplary blade 60, the channels 72a-72e have various locations on the blade that differ with reference to blade span and chord. Generally, numbers, sizes, shapes and locations of channels of a blade are dependent, e.g., on an intended use for a given rotor that includes the blade.

Figure 3:
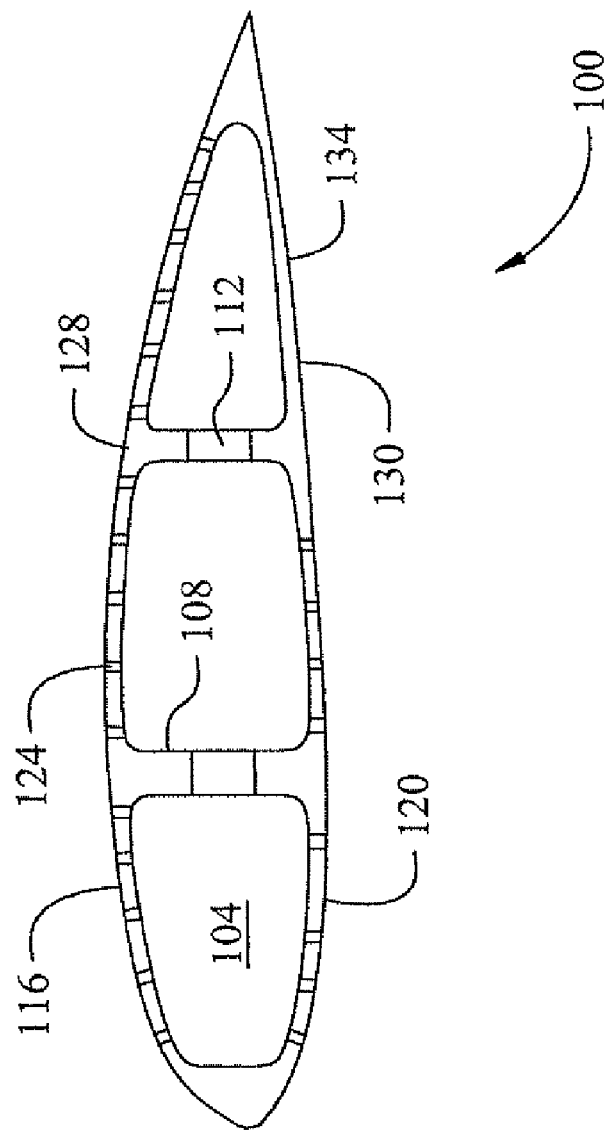
FIG. 3 is a cross-sectional view of a rotor blade in which suction may be produced, viewed looking toward a tip of the blade, in accordance with one implementation of the disclosure.

Another configuration of a rotor blade in which suction may be produced is indicated generally in FIG. 3 by reference number 100. The blade 100 has three (3) longitudinal channels 104 separated by two (2) vertical webs 108. Transverse channels 112 through the webs 108 link the longitudinal channels 104 together. It is contemplated, however, that in some configurations transverse linkage would not be provided between longitudinal channels. The longitudinal channels 104 are vented to the blade exterior surfaces 116 and 120 through a plurality of apertures 124 penetrating upper and lower walls 128 and 130 of the blade. The channels 104 thus are fluidly connected with at least a portion of the external aerodynamic surface of the rotor blade 100, i.e., with at least part of exterior surfaces 116 and 120.

The apertures 124 may have various shapes, sizes and locations as determined, e.g., by aerodynamic factors. Thus, for example, apertures may be circular, conical, slots and/or slits of various shapes, pores in porous material of various forms, etc. Apertures may be provided in chord-wise directions to various extents as desired for a particular implementation. In the example shown in FIG. 3, apertures 124 through the lower wall 130 do not extend to a trailing edge 134 of the blade. In some other configurations, however, apertures may extend to a trailing edge. It should be understood that the term "apertures" includes but is not limited to holes, slits, porosity and/or other form(s) of flow connection between internal blade channels and external aerodynamic surfaces. Apertures may be configured, e.g., with regard to diameter and spatial density, to force and maintain laminar flow over one or more surfaces in one or more regions of a blade. Blade regions over which such laminar flow may be desired can include various span-wise regions, for example, between the middle of a blade span to the blade tip. Such regions can also include chord-wise region(s), for example, between a blade leading edge and the middle of a chord.

When a blade configured as previously described is attached to and rotated on a hub, suction is created within internal channel(s) of the blade by centrifugal action. For example, consider a rotor operating in air and having a blade in which a single channel extends between the blade root and tip, where the channel is capable of fluidly communicating with most of the blade outer surface. Assume also that the blade channel is open at the blade tip so that the pressure of air in the channel at the tip is approximately equal to ambient air pressure. When the rotor is rotated, the channel is subjected to centripetal acceleration. As a result, air tends to move in the channel toward the blade tip. Where the hub end of the channel is sealed, suction is created in the channel.

Apertures (which can be very small, e.g., pore-sized) in the rotor blade surface link exterior surface(s) of the rotor blade to the suction within the rotor blade. The apertures draw air in from the exterior surface(s) to the channel. Air in the channel is slung outwards by centrifugal force, is possibly also sucked outwards by a configuration of an extraction device further described below, and is expelled overboard. Movement of air into an exterior surface of the rotor blade extracts boundary layer from the blade, thus inhibiting development of a turbulent boundary layer. Size(s) and distribution of apertures in the rotor exterior surface can be modulated to provide desired levels of flow stability. It can be shown that suction levels generated by centripetal force alone can be sufficient to facilitate laminar flow as described above. Advantageously, maintaining laminar flow on a rotor surface can provide substantial drag reduction.

Figure 4:
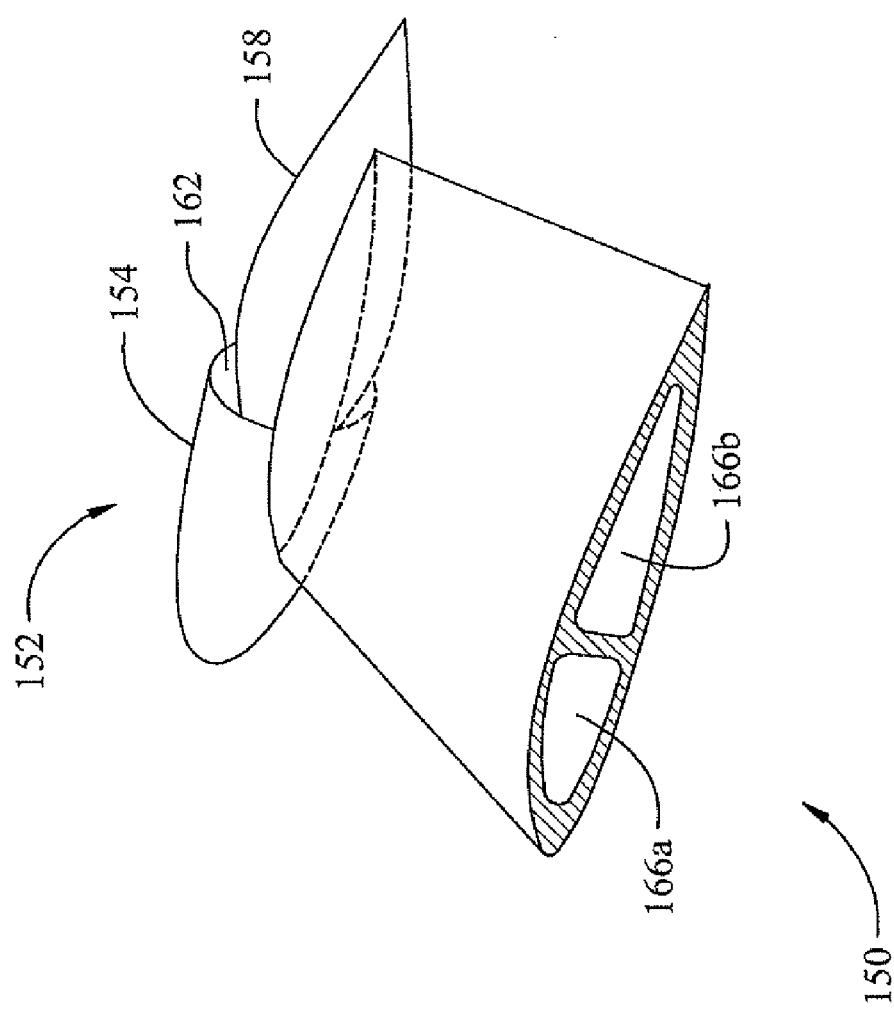
FIG. 4 is a transverse perspective view of part of a rotor blade having an extraction device in accordance with one implementation of the disclosure, the view taken looking toward a tip of the blade.

Suction may be augmented by venting internal channels to a tailored aerodynamic shape at the tip end of a rotor blade. Such shaping can be configured to provide pressure below ambient pressure at the tip end. Where additional suction is provided by extraction, it may be possible to reduce size(s) and number of apertures. Thus in some configurations an extraction device is provided on a blade tip. A blade having an exemplary extraction device is indicated generally in FIG. 4 by reference number 150. An extraction device indicated generally as 152 includes a forward body part 154 and an aft body part 158. An exit annulus 162 is capable of providing a low-pressure zone adjacent the body parts 154 and 158. The exit annulus 162 is fluidly linked with two longitudinal channels 166a and 166b of the blade 150.

Figure 5:
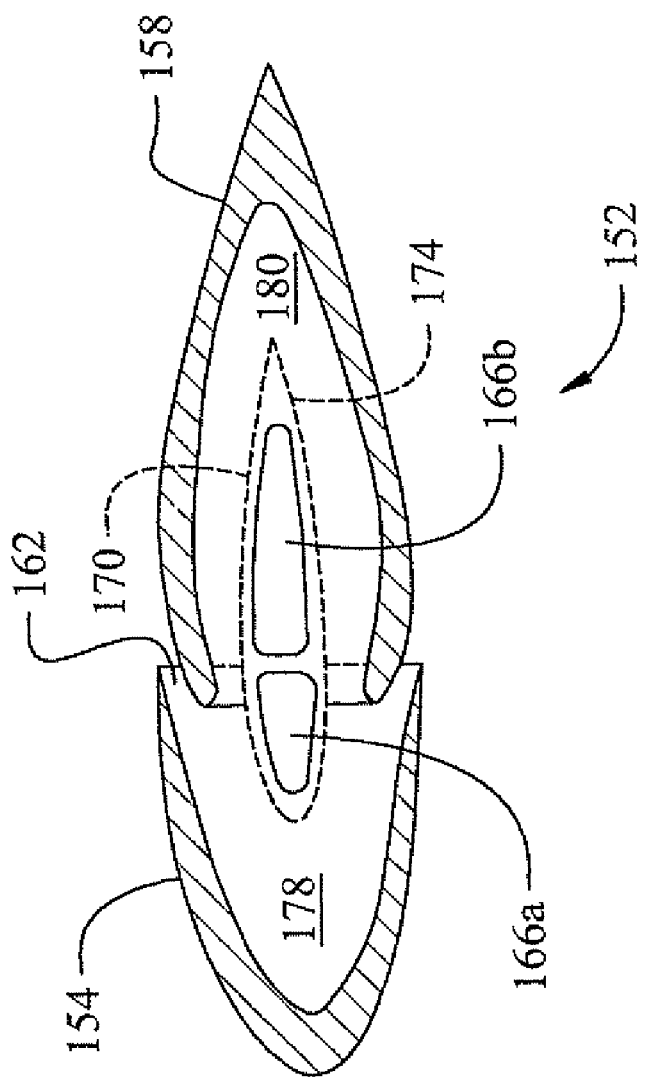
FIG. 5 is a longitudinal cross-sectional view of an extraction device of a rotor blade in accordance with one implementation of the disclosure, the view taken looking toward a hub end of the blade.

A cross-sectional view of the extraction device 152 is shown in FIG. 5. For clarity, the exterior surfaces 170 and 174 of the blade are indicated in dashed lines. The two longitudinal channels 166a and 166b penetrate the extraction device inboard side (cut away in FIG. 5) to bring fluid into a forward chamber 178 and an aft chamber 180. Low pressure in the exit annulus 162 causes fluid to be sucked out of the exit annulus 162. It should be noted that other or additional forms of extraction devices are possible. It should be noted that in some configurations, an extraction device can provide suction equal to twice the local dynamic pressure at a blade tip.

As previously mentioned, blowing may be provided in various rotor implementations. The term "blowing" may be used in the disclosure and claims to refer to the use of tailored, pressurized flow. A surface or portion of a surface affected by blowing may be referred to as being "blown".

Figure 6:
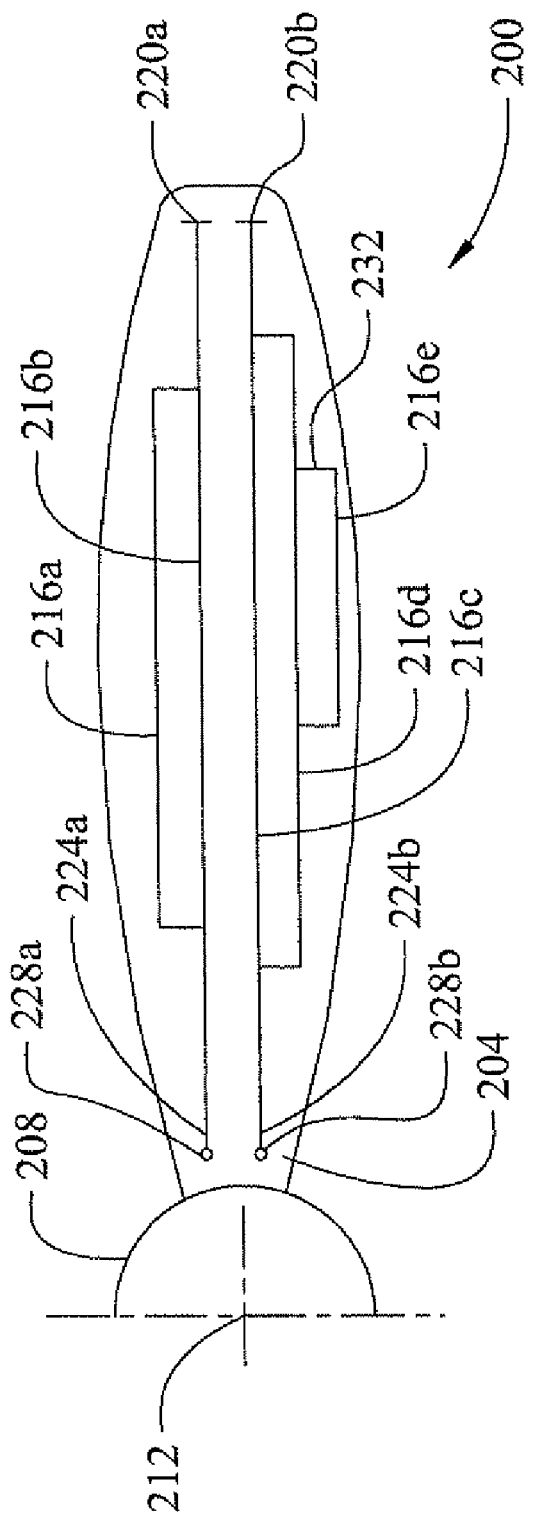
FIG. 6 is a schematic view of a rotor blade in which blowing may be produced in accordance with one implementation of the disclosure.

One configuration of a rotor blade in which blowing may be produced is indicated generally in FIG. 6 by reference number 200. A root 204 of the blade 200 is attached to a rotor hub 208 having an axis of rotation 212. Channels 216a-216e are aligned generally lengthwise within the rotor blade 200. Each channel 216a-216e is sealed shut, directly or indirectly, at tip ends 220a or 220b. Each channel 216a-216e is vented, directly or indirectly, at root ends 224a or 224b to ambient conditions at the blade root 204 through one or more outlets 228a and 228b. Several of the channels 216a-216e are fluidly linked to others of channels 216a-216e via substantially transverse channel links 232. It should be noted that other or additional channel outlets could be provided at various locations on a blade.

The channels 216a-216e may be connected to one or more portions of the external aerodynamic surface of the rotor blade through a slit, slot, gap, and/or other type of tailored opening. Opening(s) may be configured to re-energize a boundary layer of the blade in order to inhibit flow separation and improve efficiency. Location(s), size(s), and shapes(s) of such openings may be determined, e.g., by aerodynamic factors.

Figure 7:
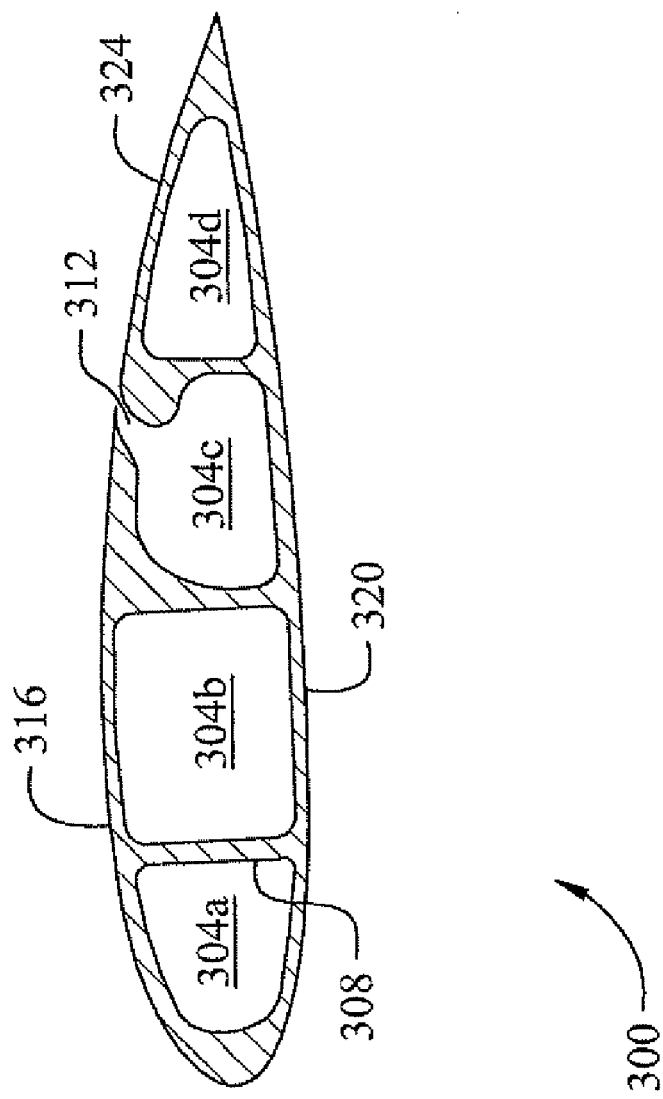
FIG. 7 is a cross-sectional view of a rotor blade in which blowing may be produced, viewed looking toward a tip of the blade, in accordance with one implementation of the disclosure.

One configuration of a rotor blade in which blowing may be produced is indicated generally in FIG. 7 by reference number 300. Longitudinal channels 304a-304d are separated by vertical webs 308. The channels 304a-304d are sealed, directly or indirectly, at their tip ends (not shown). A blowing nozzle 312 is provided through which the "blowing" channel 304c is vented to outside the blade 300. The channels 304a-304d thus are fluidly connected with at least a portion of the external aerodynamic surface of the rotor blade 300, which in the present example is an upper exterior surface aft part 324.

When a blade configured as previously described is attached to and rotated on a hub, pressure is created within internal channel(s) of the blade by centrifugal action. For example, consider a rotor operating in air and having a blade in which a single channel extends between the blade root and tip, where the channel is capable of fluidly communicating with most of the blade outer surface. Assume also that the blade channel is open at the blade root so that the pressure of air in the channel at the root is approximately equal to ambient air pressure. When the rotor is rotated, the channel is subjected to centripetal acceleration. As a result, air tends to move in the channel toward the blade tip. Where the tip end of the channel is sealed, pressure is created in the channel.

Figure 8:
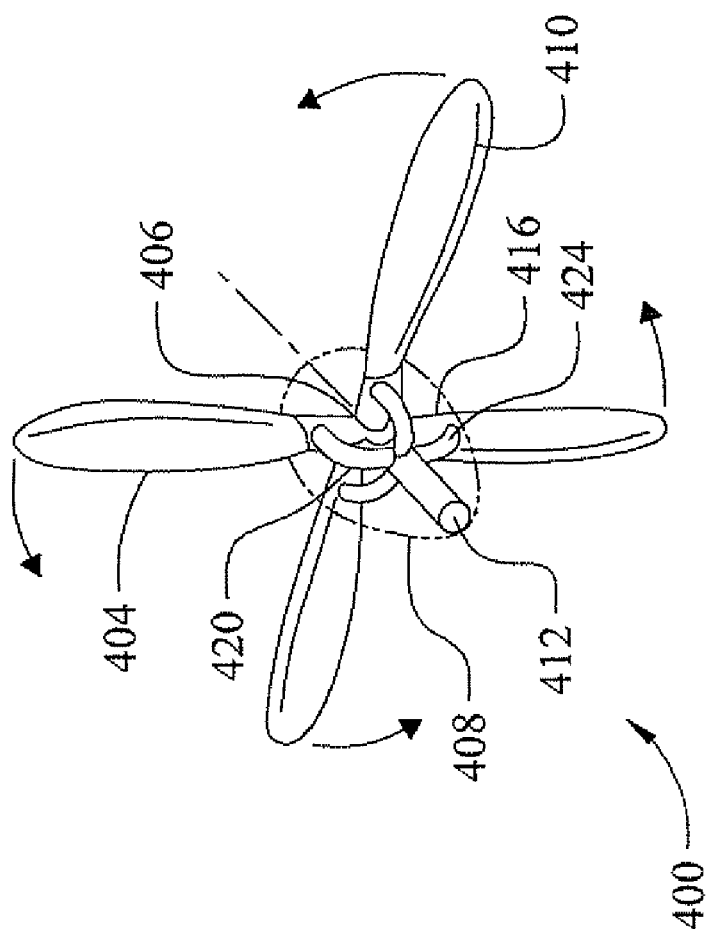
FIG. 8 is a frontal perspective view of a rotor and inlet device in accordance with one implementation of the disclosure.

In some configurations, channel root inlet pressure may be augmented through use of an aerodynamic device and/or by actively pressurizing inlet flow, e.g., using a compressor. For example, one or more inlet devices may be provided to increase pressure at the root ends of channels. Such devices may be located at a rotor blade root and/or one or more intermediate locations across the span of a rotor blade. Inlet devices may be of various types. One configuration of a rotor including such a device, a "pitot"-type inlet device, is indicated generally in FIG. 8 by reference number 400. The rotor 400 includes a plurality of blades 404 attached to a hub 406. A spinner 408 is shown in phantom. Each blade has a blowing slot 410 in accordance with various aspects of the disclosure, e.g., as previously described. A pitot inlet 412 provides ram air to roots 416 of the rotor blades. Air at ram pressure is provided to the roots via a manifold 420 of transfer tubes 424. The tubes 424 may be flexible, e.g., to permit the rotor blades 404 to rotate in pitch.

Figure 9:
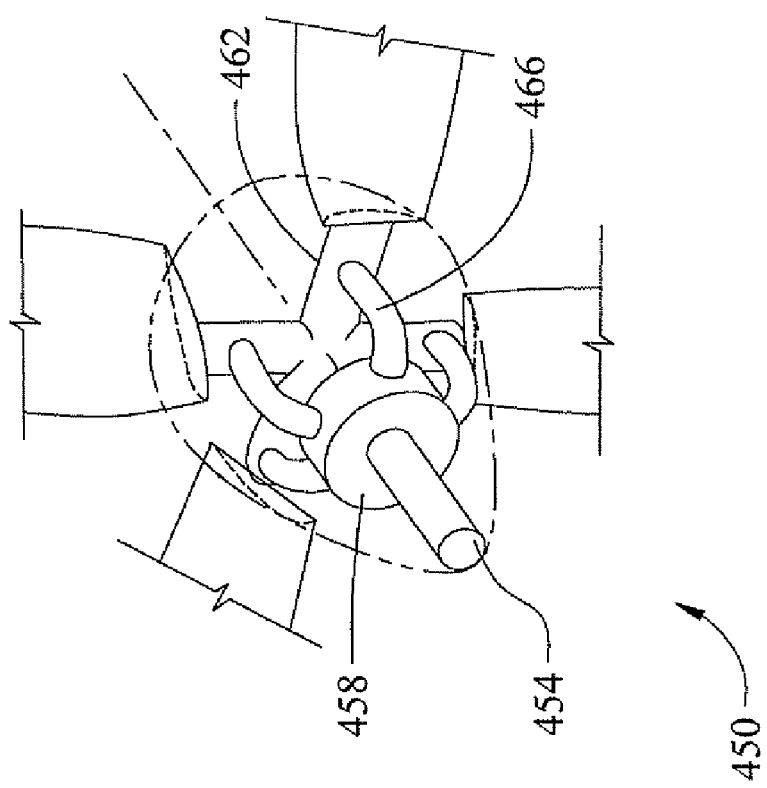
FIG. 9 is a frontal perspective view of a rotor and inlet device in accordance with one implementation of the disclosure.

Another configuration of an inlet device is indicated generally in FIG. 9 by reference number 450. Air entering a pitot inlet 454 is compressed by a compressor 458 and then fed to rotor blade roots 462 by transfer tubes 466. The compressor 458 may be electrically driven from power provided to the rotor hub via slip rings (not shown).

Figure 10A:
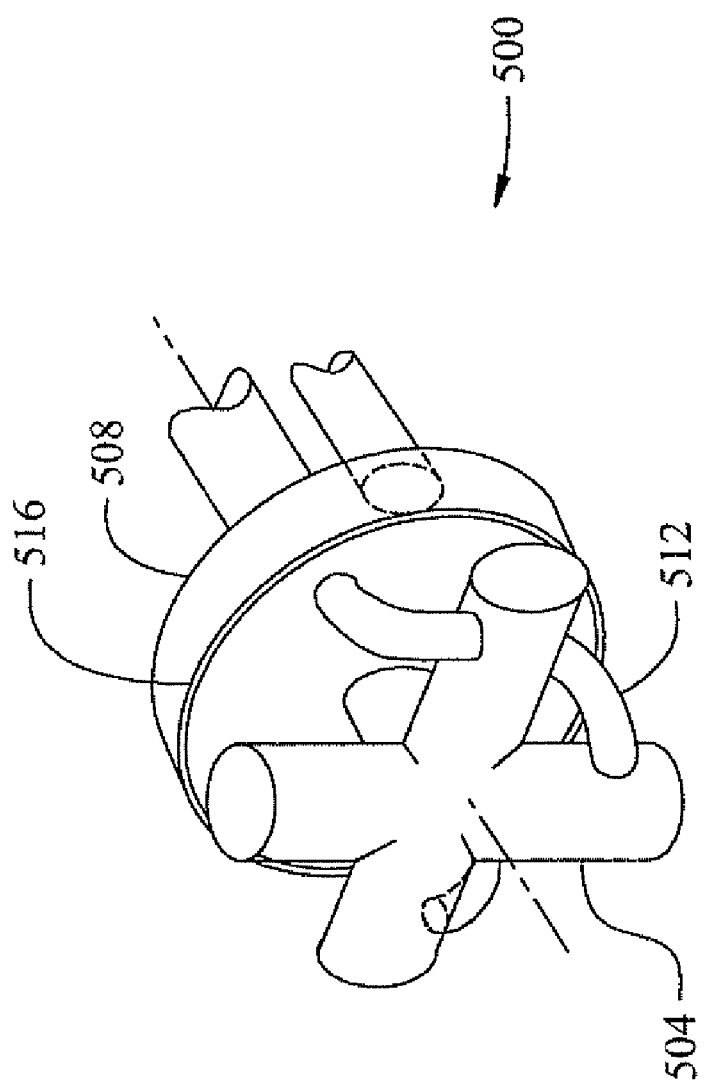
FIGS. 10A and 10B are a frontal perspective view and a side cross-sectional view of a rotor and inlet device in accordance with one implementation of the disclosure.
Figure 10B:
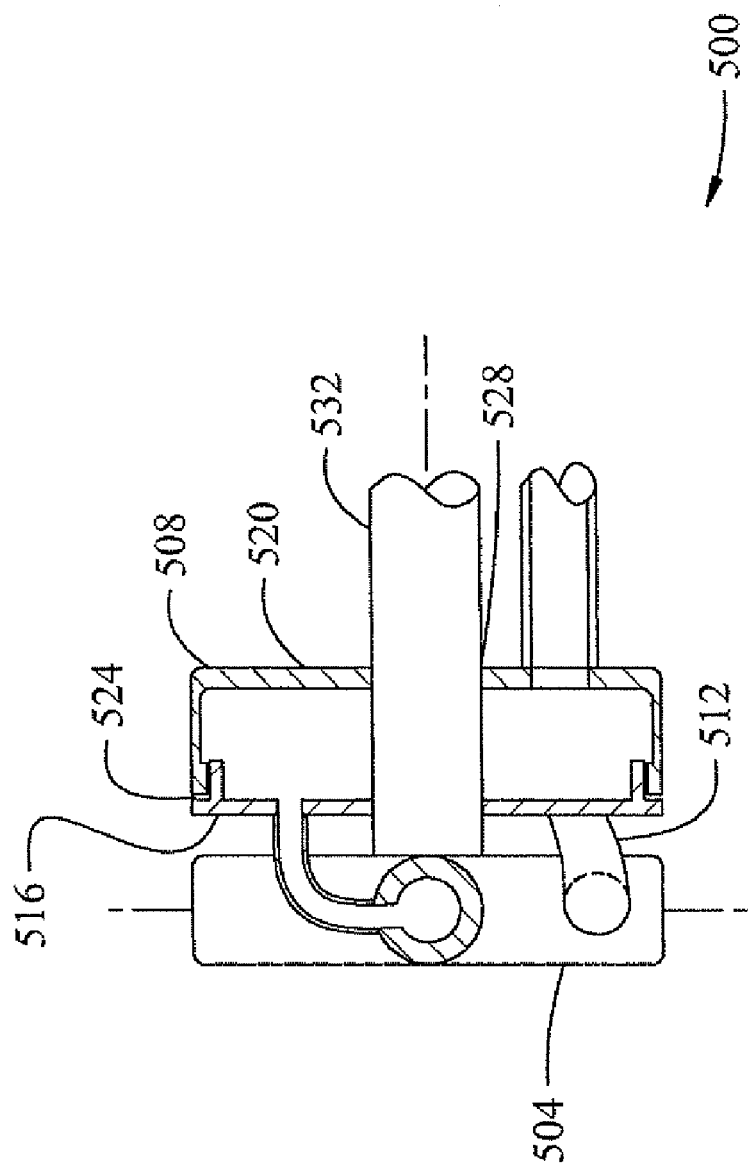

Another configuration of an inlet device is indicated generally in FIGS. 10A and 10B by reference number 500. A hollow propeller hub 504 is connected with an air box 508 via transfer tubes 512. The transfer tubes 512 are connected with a spinner backplate 516 that rotates with the propeller hub 504. An aft portion 520 of the air box is affixed to an airframe (not shown). Compressed air is provided by an airframe-mounted compressor (not shown) to the air box 508. A junction 524 between the spinner backplate 516 and air box 508 may have a seal or a gap precisely configured to limit leakage from the air box 508. In the same or a similar manner, a junction 528 between the air box aft portion 520 and a shaft 532 of the propeller 504 may have a seal or a gap precisely configured to limit leakage from the air box 508.

Figure 11:
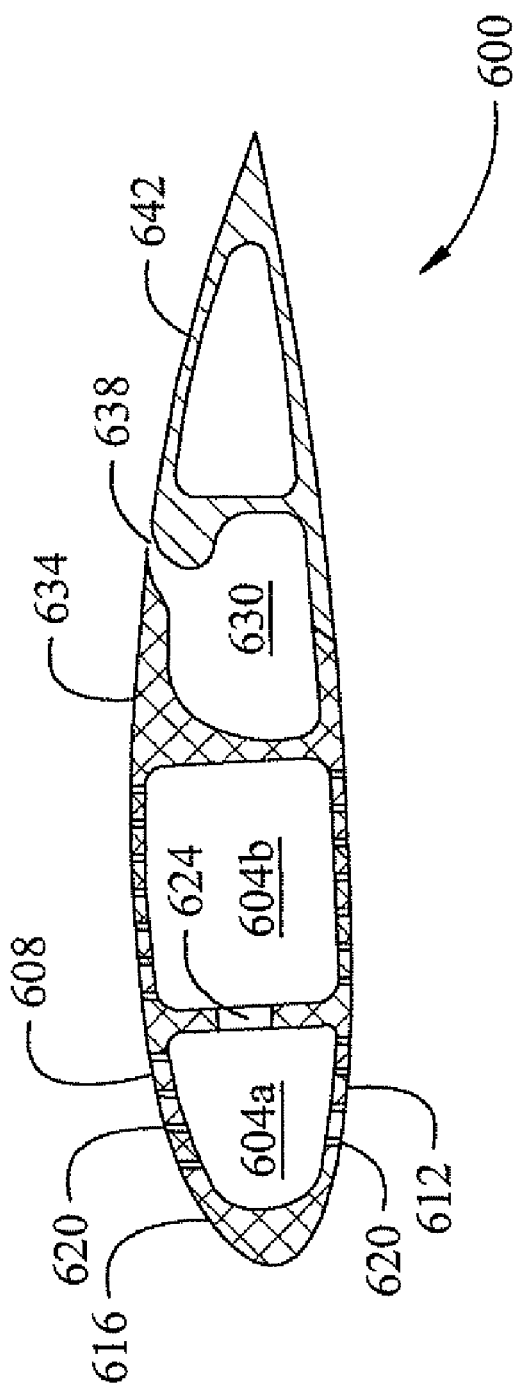
FIG. 11 is a cross-sectional view of a rotor blade in which suction and blowing may be produced, viewed looking toward a tip of the blade, in accordance with one implementation of the disclosure.

Blowing and suction may be combined as to the same rotor so that both types of channels are employed on the same rotor and/or on the same rotor blade. One configuration of a rotor blade in which suction and blowing are combined is indicated generally in FIG. 11 by reference number 600. The blade 600 includes forward suction channels 604a and 604b that provide laminar flow on an upper surface 608 and lower surface 612 of a forward portion 616 of the blade. The forward portion 616 includes a plurality of apertures 620 through the upper and lower surfaces 608 and 612. A transverse channel 624 links the suction channels 604a and 604b. A single blowing channel 630 in a middle-aft portion 634 of the blade provides blowing through a blowing nozzle 638 over an upper aft portion 642 of the blade.

Transverse channels may or may not be provided in a given configuration to link span-wise channels. In some implementations transverse links may be provided to reduce or minimize pressure loss due to air flow resistance within the channels, by providing additional cross section area. Additionally or alternatively, transverse links may be included between channels to increase an effective channel length and thereby provide an increased pressure differential.

Figure 12:
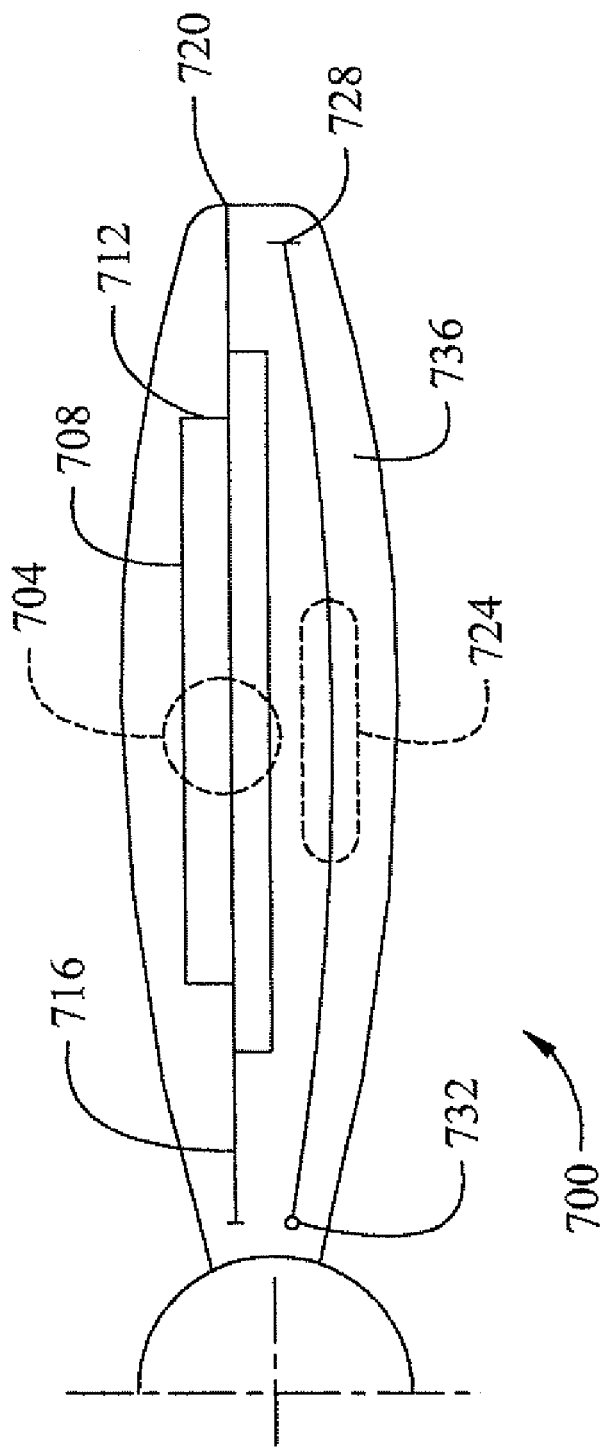
FIG. 12 is a schematic view of a rotor blade in which suction and blowing may be produced in accordance with one implementation of the disclosure.

One configuration of a rotor blade is indicated generally in FIG. 12 by reference number 700. The blade 700 includes a plurality of suction channels 704 that provide suction over a forward portion 708 of the blade. The longitudinal channels 704 are linked together via transverse channels 712. The channels 704 are sealed at a hub end 716 of the blade and are vented outside the blade at a tip outlet 720. A single blowing channel 724 is sealed at a tip end 728 of the blade and open at an inlet 732 at the hub end 716 to provide blowing over an aft portion 736 of the blade.

When suction is used in rotors as previously described, active laminar flow can be produced that reduces parasitic drag of rotors, thereby improving efficiency. Active laminar flow can reduce the extent and degree of turbulent flow over rotors. Thus, noise from this source can be reduced. Providing active laminar flow can add a degree of design freedom that permits a rotor designer to improve other or additional rotor characteristics without losses that might otherwise be incurred. For example, rotor chord and/or depth might be increased to address structural concerns without an increase in parasitic drag. Rotor diameter might be increased without the usual penalty in parasitic drag, thereby increasing efficiency. Other potential design benefits could include combinations of increases in rotor diameter with a decrease in rotor RPM with a reduced parasitic drag, resulting in increased efficiency. Rotor RPM might be increased without a resulting increase in parasitic drag. Furthermore, a need for shrouding a rotor with a duct to reduce radiated noise might be eliminated where the rotor noise can be reduced at the source. When suction is used in rotors as previously described, active laminar flow can be provided without any additional moving parts such as pumps. Active laminar flow can be provided without a significant addition of energy to power the system, in contrast to most known active laminar flow systems.

When blowing is used in rotors as previously described, flow separation can be reduced, improving efficiency by reducing drag. Blowing can increase the maximum lift coefficient of a rotor blade section without flow separation and attendant efficiency losses. This increase can increase maximum thrust or rotor lift and increase the efficiency of the rotor in off-design conditions. In other words, using blowing in a rotor can broaden the range of operating conditions in which the rotor is efficient. Blowing may enable a designer to reduce blade chord while maintaining needed lift or power. This may reduce the rotor blade weight or improve efficiency. Blowing can be provided as previously described without any additional moving parts such as pumps. Blowing can be provided without a significant addition of energy to power the system.

The present disclosure can be implemented in various ways that can reduce rotor noise while improving rotor efficiency. Noise reduction can be particularly desirable in relation to wind farms and other wind turbine implementations, especially where wind turbines may be located in populated areas. In the case of wind turbines, improved efficiency increases electrical output for a given wind speed. In the case of propulsion devices, increased efficiency can result in increased thrust, or the same thrust at less power, thereby saving fuel or energy. In the case of helicopters, improvement in efficiency can result in increased helicopter speed or the same speed at reduced energy consumption.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A rotor blade comprising:
a root attachable to a rotor hub;
a tip;
a plurality of channels aligned within the blade extending lengthwise, parallel to one another, and generally between the root and the tip, at least one of said channels having a sealed first end and a second end vented to outside the blade;
the at least one channel being vented to one or more exterior surfaces of the blade through a plurality of apertures in the one or more exterior surfaces such that rotation of the root of the blade results in centrifugal force acting on a fluid moving over said apertures, to produce a suction of the fluid through said apertures into the at least one channel and outwardly through the second end to the outside of the blade; and
wherein the suction is produced by a pressure differential existing within the at least one of the channels when rotation of a hub to which the root of the blade is attached moves a fluid in the at least one of the channels toward the tip of the blade.

2. The blade of claim 1, wherein the sealed first end of the at least one of the channels is nearer to the root than to the tip.

3. The blade of claim 1, wherein a different one of the plurality of channels has a sealed first end and a second end vented to outside of the blade, and wherein the sealed first end of the different one of the plurality of channels is nearer to the tip of the blade than to the root.

4. The blade of claim 1, wherein the pressure differential extracts at least part of a boundary layer from at least one of the one or more exterior surfaces through at least one of the apertures.

5. The blade of claim 1, wherein the plurality of channels includes a first channel linked for fluid flow with a second channel, the first end and/or second end of the first channel shared with the second channel.

6. A rotor comprising the blade of claim 1.

7. A rotor blade comprising:
a root attachable to a rotor hub;
a tip;
a plurality of channels aligned within the blade extending lengthwise, parallel to one another, and generally between the root and the tip, at least one of said channels having a sealed first end and a second end vented to outside the blade;
the at least one channel being vented to one or more exterior surfaces of the blade through a plurality of apertures in the one or more exterior surfaces such that rotation of the root of the blade results in centrifugal force acting on a fluid moving over said apertures, to produce a suction of the fluid through said apertures into the at least one channel and outwardly through the second end to the outside of the blade; and
wherein the plurality of channels includes a first channel linked for fluid flow with a second channel, the first end and/or second end of the first channel shared with the second channel.

* * * * *